E. M. HILL.
MILK BOTTLE CAP.
APPLICATION FILED APR. 29, 1920.

1,430,308.
Patented Sept. 26, 1922.

Inventor.
Edith M. Hill
by Heard Smith & Tennant.
Attys.

Patented Sept. 26, 1922.

1,430,308

UNITED STATES PATENT OFFICE.

EDITH M. HILL, OF MELROSE, MASSACHUSETTS, ASSIGNOR, BY MESNE ASSIGNMENTS, TO JOHN E. HILL, OF MELROSE HIGHLANDS, MASSACHUSETTS.

MILK-BOTTLE CAP.

Application filed April 29, 1920. Serial No. 377,646.

*To all whom it may concern:*

Be it known that I, EDITH M. HILL, a citizen of the United States, residing at Melrose, county of Middlesex, State of Massachusetts, have invented an Improvement in Milk-Bottle Caps, of which the following description, in connection with the accompanying drawing, is a specification, like characters on the drawing representing like parts.

This invention relates to milk bottle caps and has for its object to provide a cap which has a resilient arm extending therefrom that is constructed not only to yieldingly hold the cap in position on the milk bottle, but also to provide means for swinging the cap into open position when it is desired to pour out the contents of the bottle.

In order to give an understanding of my invention, I have illustrated in the drawing a selected embodiment thereof which will now be described, after which the novel features will be pointed out in the appended claims.

In the drawings, Fig. 1 is a perspective view of a milk bottle cap embodying my invention;

Figure 1:
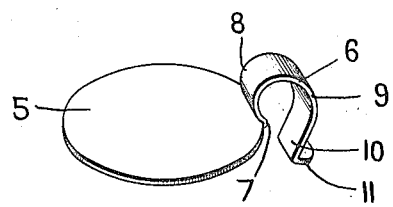

In the drawings, 1 indicates a portion of a milk bottle which has at its neck the usual shoulder 2 on which the cap usually rests and which is also provided with the bead portion 3. The latter is shown as having the inclined outer wall 4 which is located below the shoulder 2. Most milk bottles are made with the neck shaped substantially as above described.

My improved milk bottle cap comprises a body portion 5 in the form of a disk which is adapted to seat on the shoulder 2 and close the bottle in the usual way, and a specially-constructed resilient arm indicated generally at 6 which performs the double function of yieldingly holding the milk bottle cap to the bead 3 and also provides the means for tilting the cap into an open position when the contents of the bottle are to be discharged. This arm 6 is of resilient material and either may be integral with the body 5 or may be a separate piece rigidly secured thereto. In any event, it is important that it should be of resilient material.

Figure 2:
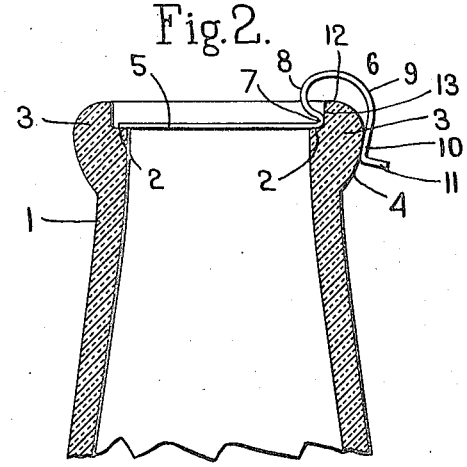
Fig. 2 is a sectional view through the neck of a bottle showing my improved cap applied thereto.

In order to perform the double function above set forth, this arm 6 has a special shape. It is secured to or extends from the body 5 at one edge thereof, as shown at 7, and it extends upwardly and inwardly from the point 7, as shown at 8, and then is curved outwardly and downwardly, as indicated at 9, so as to embrace the bead 3 of the bottle neck. This arm is of sufficient length to extend down below the body 5 and the lower end thereof is bent inwardly toward the edge of the body, as shown at 10, while the extremity of the arm is bent outwardly, as shown at 11, thereby to form a finger-piece. The upwardly and inwardly-extending portion 8 of the arm has a greater extent than the distance between the shoulder 2 of the milk bottle and the top 12 of the bead so that when the cap is applied to the bottle, as shown in Fig. 2, the upper curved portion of the arm is spaced from the top 12 of the bead. The natural shape of the arm 6 is such that when the cap is applied to the bottle, the portion 10 of the arm will engage the exterior face of the bead 3 of the bottle just below the point of largest diameter, and the act of placing the cap in the bottle will bend the arm outwardly slightly, thus placing it under a slight tension thereby providing for said arm functioning to hold the cap securely in place.

Figure 3:
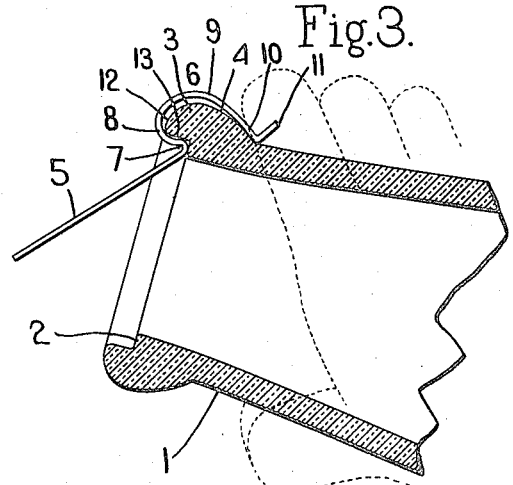
Fig. 3 shows the manner in which the cap is manipulated when it is to be opened to pour out the contents of the bottle.

The arm will perform its function of opening the cap when downward pressure is applied to the finger-piece 11. The application of downward pressure to the finger-piece 11 will cause the end 10 of the arm to slide down the inclined face 4 of the bead, and since the opposite end of the arm where it is attached to the disk 5 at 7 engages the wall 13 of the bottle neck, the application of this downward pressure will cause the arm to swing into the angular position shown in Fig. 3 thereby swinging the cap 5 into open position about the portion 7 as a fulcrum. This change of angular position of the arm is freely permitted because of the fact that the end 8 thereof extends inwardly and upwardly, and, therefore, in the closed position of the cap it is directed upwardly away from the wall 13. Consequently, the downward pressure on the finger-piece 11 sufficient to swing the arm into the angular position shown in Fig. 3 will swing the upwardly-inclined portion 8 of the arm toward the wall 13, and when the arm has reached such a position as to bring the part 8 against the wall shown in Fig. 3 the cap will be opened so that the contents of the bottle can be readily poured out. This swinging of the arm into the angular position by downward pressure on the finger-piece 11 causes the arm to flex somewhat, thus placing it under greater tension, so that as soon as the pressure on the finger-piece is released, the resiliency of the arm will restore the parts to the position shown in Fig. 2 and will thereby close the bottle. This manipulation of the arm can readily be performed by the finger or thumb of the hand of the person that picks up the bottle to pour out some of the contents.

The device can be made as a single piece and is extremely simple in construction. It can be quickly applied to a bottle and can be easily manipulated by the fingers of the hand that holds the bottle, so that the opening and closing of the cap does not require any separate motions besides those which a person naturally performs in picking up a bottle of milk to pour out some of the contents.

Further, the construction is such that the device is self-closing as soon as the pressure is removed from the finger-piece.

While I have illustrated a selected embodiment of the invention, I do not wish to be limited to the constructional features shown.

I claim:

A milk bottle cap comprising a disk-shaped portion to close the neck of the bottle, said disk-shaped portion having integral therewith a resilient arm extending upwardly and inwardly from one edge of said disk and then outwardly, downwardly and inwardly to a point below said disk, the extremity of said arm being bent outwardly to form a finger piece and said arm having a curve of such shape that when the cap is closing the neck of the bottle said arm will clear the bead of the bottle neck and the lower end of the arm will engage the inclined under face of said bead whereby downward pressure on the finger piece causes such lower end to slide downwardly on the inclined face of the bead thereby causing the disk to tilt about its edge.

In testimony whereof, I have signed my named to this specification.

EDITH M. HILL.